United States Patent [19]

Lim et al.

[11] Patent Number: 5,141,217
[45] Date of Patent: Aug. 25, 1992

[54] DEVICE FOR FEEDING PAPER FOR USE IN A FACSIMILE

[75] Inventors: Kyoung-Taek Lim, Seoul; Hyoung-Chae Kim, Ahnyang; Byoung-Ju Lee, Seoul, all of Rep. of Korea

[73] Assignee: Samsung Electronics Co., Ltd., Suweon, Rep. of Korea

[21] Appl. No.: 534,238

[22] Filed: Jun. 7, 1990

[51] Int. Cl.⁵ .............................. B65H 5/00
[52] U.S. Cl. ........................ 271/10; 271/114; 271/115; 271/116; 271/270; 400/629; 198/577
[58] Field of Search ............ 271/4, 10, 114, 115, 271/116, 202, 101, 270, 314; 400/624, 629; 198/577

[56] References Cited

U.S. PATENT DOCUMENTS

| | | | |
|---|---|---|---|
| 3,563,533 | 2/1971 | Limberger | 271/114 X |
| 4,331,328 | 5/1982 | Fasig | 198/577 X |
| 4,362,375 | 12/1982 | Tahara et al. | 198/577 X |
| 4,451,027 | 5/1984 | Alper | 198/577 X |
| 4,529,188 | 7/1985 | Sturnick | 271/114 X |
| 4,927,130 | 5/1990 | Tanaka et al. | 271/114 X |

FOREIGN PATENT DOCUMENTS

| 48105 | 5/1981 | Japan | 271/116 |
|---|---|---|---|
| 48901 | 1/1989 | Japan | 271/270 |
| 48612 | 12/1986 | United Kingdom | 271/270 |

OTHER PUBLICATIONS

W. Goff, Jr., IBM Technical Disclosure Bulletin, Drive Mechanism, Oct. 1974, p. 1301, vol. 17, No. 5.
The Random House College Dictionary, for "synchronize", p. 1333 (1975).

Primary Examiner—H. Grant Skaggs
Assistant Examiner—Carol Lynn Druzbick
Attorney, Agent, or Firm—Robert E. Bushnell

[57] ABSTRACT

There is disclosed a device for feeding documents stacked in a document tray for use in a facsimile machine. The device includes a pick-up roll for picking up the undermost document of the stacked documents, a transferring roll for transferring the document picked up by the pick-up roll, the two rolls being mounted parallel and synchronized with each other, a shaft for rotating the pick-up roll, a bushing having a cylindrical portion and a notch portion and fixedly mounted on one end portion of the shaft, a driving gear having a cylindrical portion and a plurality of notch portions and loosely mounted on the end portion of the shaft with the cylindrical portions opposing each other, and a clutch spring having an internal end and external end and encircling the two cylindrical portions with the internal and external ends respectively caught in the notch portions.

9 Claims, 2 Drawing Sheets

DEVICE FOR FEEDING PAPER FOR USE IN A FACSIMILE

BACKGROUND OF THE INVENTION

The present invention generally concerns a device for feeding documents for use in a facsimile system, wherein the gap between a preceding document and an incoming document is kept enough to prevent a paper jam caused by an overlapping of the documents.

Generally, there are two kinds of such devices. One type includes a sensor for sensing the trailing end of the preceding document when the trailing end passes by a pick-up roll, so that the next incoming document will be loaded, in response to the sensing signal, by the pick-up roll after a predetermined time delay. Another type is manufactured such that the pick-up roll is provided with an element like a notch for restricting the pivoting motion of the pick-up roll to a certain degree, so that the documents may be loaded successively with the gap between the documents being kept enough to prevent the document jam.

The former type of feeding device requires an external control device such as i.e. a clutch for connecting and disconnecting the pick-up roll to the drive shaft and a control circuit for controlling the clutch. The latter type of feeding device requires a hooking element (e.g., pin, etc.) for enabling the pick-up roll to rotate along with the rotating shaft, and a ratchet gear for permitting only one directional rotation of the rotating shaft, i.e., the document feeding direction. Hence, the conventional document feeding device for a facsimile machine has a complicated construction because of the increased number of the components thereof, thus increasing the production cost.

SUMMARY OF THE INVENTION

Therefore, it is an object of the present invention to provide a device for feeding documents without paper jams, by employing an element for delaying the entry of an incoming document.

It is another object of the present invention to provide a device for delaying the rotation of a pick-up roll time period to temporarily prohibit the document feeding device from loading a document.

It is another object of the present invention to provide a device for feeding documents separately, maintaining a gap between a preceding document and an incoming document.

It is still another object of the present invention to provide a device for controlling the cycling of the driving power connected to a pick-up roll in a document feeding device.

According to the present invention, a device for feeding documents for use in a facsimile includes: a pick-up roll for picking-up an undermost document stacked in a document tray; a transferring roll for transferring the document picked-up by the pick-up roll, the two rolls being mounted substantially parallel to each other, the two rolls being synchronized with each other; a shaft extended toward either end along the axis of the pick-up roll, for rotating the pick-up roll; a bushing, fixedly mounted on one end portion of the shaft, for transferring driving power to the shaft, the bushing having a cylindrical portion and a notch portion; a driving gear, loosely mounted on the end portion of the shaft, for the pick-up roll, the driving gear having a cylindrical portion and a plurality of notch portions; and a clutch spring, mounted over the respective cylindrical portions formed on the driving gear and the bushing, for connecting the driving power of the driving gear to the bushing.

Other objects and further features of the present invention will be apparent from the following detailed description with respect to the preferred embodiments of the invention when read in conjunction with the accompanying drawings.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

An embodiment for feeding documents taken according to the present invention will be described hereinafter with reference to the accompanying drawings only by way of example.

Figure 1:
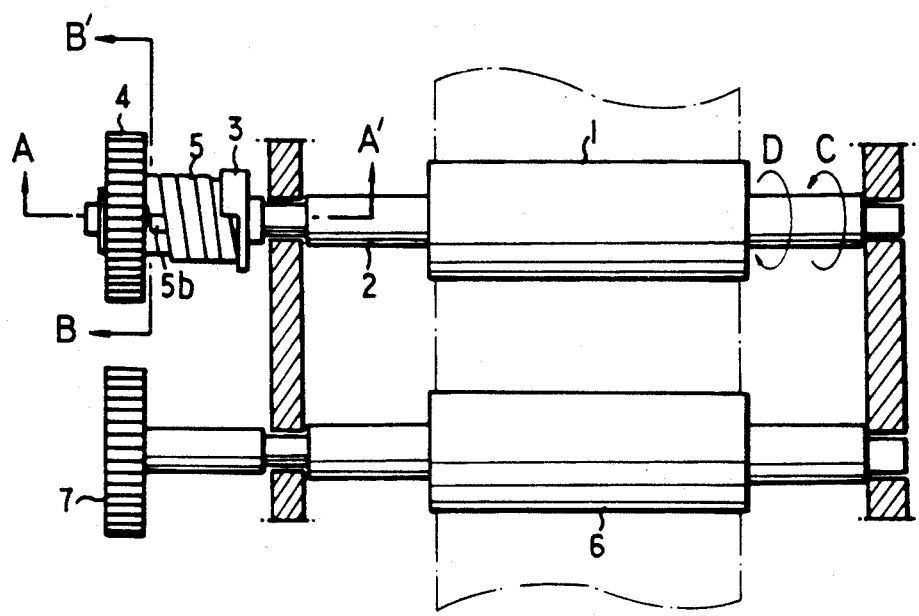
FIG. 1 is a schematic plane view of an inventive device for feeding documents.
Figure 2:
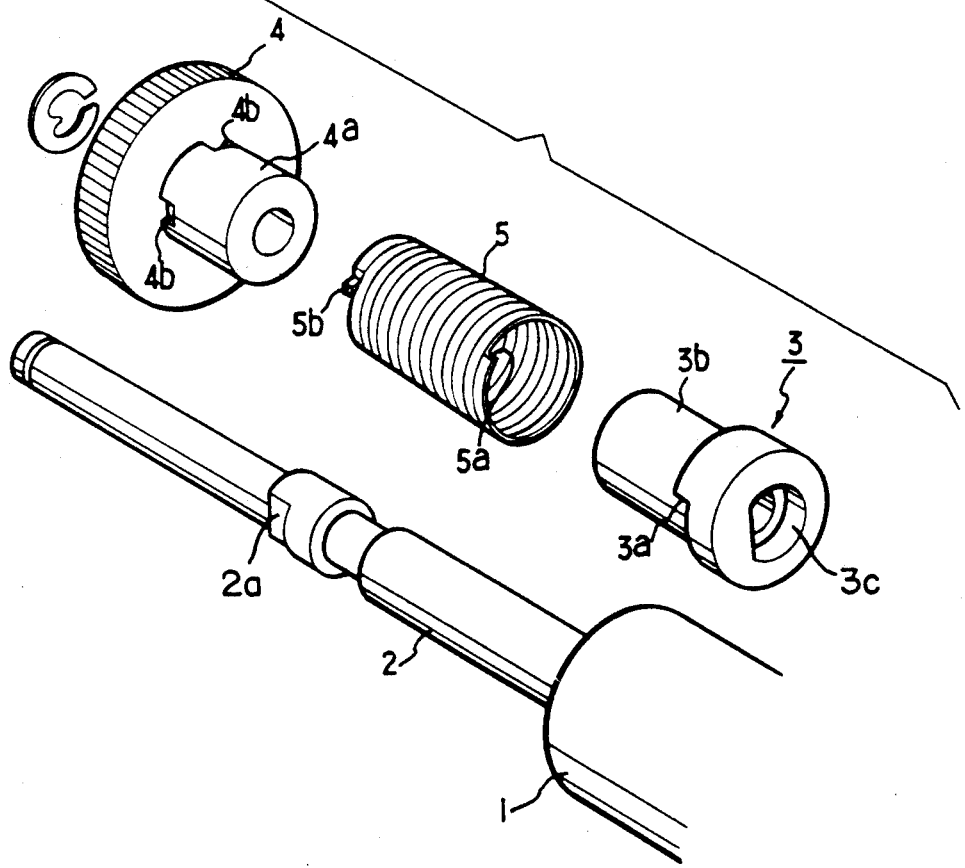
FIG. 2 illustrates an exploded perspective view of the driving mechanism for the pick-up roll of the inventive device for feeding documents.
Figure 3:
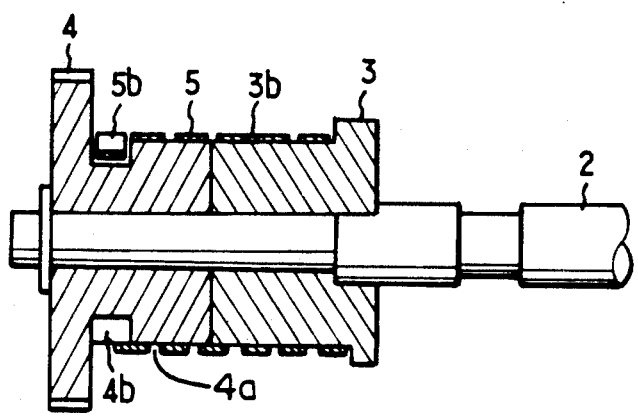
FIG. 3 is a cross-sectional view taken along the line A—A' of FIG. 1.
Figure 4:
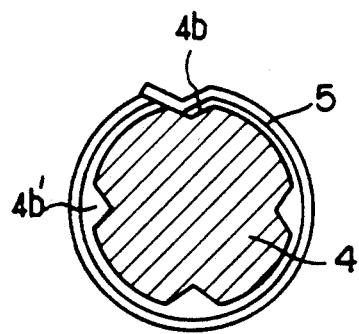
FIG. 4 is a cross-sectional view taken along the line B—B' of FIG. 1.

A bushing 3 having a cylindrical portion $3_b$ and a notch portion $3_a$ is fixedly mounted at an end portion of a shaft 2 of a pick-up roll 1 for example, by engagement of D-shaped opening $3_c$ with notched portion $2_a$ of sheet 2. Opposing the cylindrical portion $3_b$, there is loosely mounted so as to rotate freely about shaft 2, a driving gear 4 having a cylindrical portion $4_a$ and a plurality of notch portions $4_b$ at the end-most portion of the shaft 2. The notch portions $4_b$ are provided equidistantly along the periphery of the cylindrical portion $4_a$. The cylindrical portions $3_b$ and $4_a$ have the same diameter, and contactingly face each other. As illustrated in FIG. 3, the two cylindrical portions $3_b$ and $4_a$ are encircled by a clutch spring 5 with its internal and external ends $5_a$ and $5_b$ respectively caught in the notch portions $3_a$ and $4_b$. As illustrated in FIG. 4, the external end $5_b$ of the clutch spring 5 is bent into such a form that is may be resiliently pushed out from the notch portions $4_b$.

In operation, when the undermost one of the documents stacked in a document tray (not shown) is fed onto the pick-up roll 1, driving gear 4 of the pick-up roll and driving gear 7 of transferring roll 6 are synchronized with each other, so that the pick-up roll 1 and transferring roll 6 rotate simultaneously in the same direction. Hence, the document is transferred to the transferring roll 6 from the pick-up roll 1.

Specifically describing the transferring of power to the pick-up roll 1, the clutch spring 5 is closely tightened to the cylindrical portions $4_a$ and $3_b$ in the rotatable direction, so that the rotational force of the driving gear 4 is transmitted through the clutch spring 5 to the bushing 3, thus rotating the pick-up roll 1 in the direction of an arrow C. Consequently, the document is automatically fed and transferred to the transferring roll 6. Then, if the leading end of the document contacts the transferring roll 6, the document is tensed between the pick-up roll 1 and the transferring roll 6 because the diameter of the pick-up roll 1 is smaller than that of the transferring roll 6. Namely, the document feeding speed by the pick-up roll 1 is slower than the document transferring speed by the transferring roll 6. Thus, there is produced a phase difference $\Delta\Theta$ between the shaft 2 and the driving gear 4 of the pick-up roll 1, and between the pick-up roll 1 and the bushing 3.

In this case, if the length of the document is assumed as L, the phase difference $\Delta\Theta$ between the bushing 3 and the driving gear 4 will be $2L(1/D_a-1/D_b)$. Here, $D_a$ and $D_b$ respectively indicate the diameters of the pick-up roll 1 and the transferring roll 6. The phase difference between the pick-up roll 1 and the driving gear 4 is $\Delta\Theta$, which is accumulated by the fact that the external and internal ends $5_b$ and $5_a$ of the clutch spring 5 are respectively caught in the notch portions $4_b$ of the driving gear 4 and the notch portion $3_a$ of the bushing 3, so that rotational force to the direction D is produced by the phase advancing of the bushing 3.

If the length of the document being fed is longer than that of a regular document, the phase difference $\Delta\Theta$ is increased and thus the tension of the clutch spring 5 is also increased. Then, the torque of the clutch spring 5 is increased in the direction D, so that the external end portion $5_b$ is released from the notch portion $4_b$ and moves to the next notch portion $4_b'$ so as to absorb a part of the torque, thereby decreasing the phase difference $\Delta\Theta$ below a certain value. In this way, the phase movement proper for the length of a document is achieved, and the phase difference $\Delta\Theta$ remains until the trailing end of the document emerges from the pick-up roll 1, so that the next document is fed onto the pick-up roll 1. The rotation of pick-up roll 1 is delayed for a given period to temporarily prohibit the pick-up roll 1 from picking up and feeding the next document until the torque in the clutch spring has again decreased. Hence, even if the shaft 2 is rotated in a direction C of increasing the phase difference $\Delta\Theta$, the clutch spring 5 closely contacts the cylindrical portions $3_b$ and $4_a$ until there exists nogap between them, so that the rotational force in the direction C is transferred to the pick-up roll 1 via the clutch spring 5, the bushing 3 and the rotating shaft 2, thereby feeding the next document. The document interval I between the preceding document and the incoming document is $$I=\Delta\Theta \cdot D_a/2$$

This continuous movement causes the incoming document to be properly fed with a certain time interval, keeping a certain gap with the preceding document.

As described above, the present invention enables the stacked documents to be properly fed one by one, so that the reliability of the machine is improved, and the document transferring mechanism is simplified, decreasing the size and weight of machine.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A device for feeding documents comprising:

a pick-up roll for picking up an undermost document stacked in a document tray;

a transferring roll for transferring the document picked up by said pick-up roll, said transferring roll being mounted parallel to said pick-up roll;

a transfer driving gear for driving said transferring roll;

a pick-up shaft for rotatably mounting said pick-up roll;

a bushing, mounted on one end portion of said shaft for rotation with said shaft, for transferring driving power to said shaft, said bushing having a cylindrical portion and a notch portion;

a pick-up driving gear synchronized with said transfer driving gear, mounted on said one end portion of said shaft for free rotation about said shaft, for driving said pick-up roll, said driving gear having a cylindrical portion and a plurality of notch portions; and a clutch spring, mounted over said respective cylindrical portions formed on said pick-up driving gear and said bushing, said clutch spring having one end portion caught in one of said plurality of notch portions in said pick-up driving gear and another end portion caught in said notch portion of said bushing for connecting said driving power of said pick-up driving gear to said bushing.

2. The device for feeding documents as claimed in claim 1, wherein said clutch spring allows for relative rotational movement between said driving gear and said bushing.

3. The device for feeding documents as claimed in claim 1, wherein the conveying speed of the outer surface of said pick-up roll is lower than the conveying speed of the outer surface of said transferring roll when said rolls are rotated at the same rotational speed.

4. The device for feeding documents as claimed in claim 3, wherein:

said document being fed is first fed by said pick-up roll from said document tray to said transferring roll along a first portion of a feeding path at a first feeding speed;

said document being temporarily fed by both said transferring roll and said pick-up roll during a second portion of said feeding path, said sheet feeding speed being increased to a rate determined by said conveying speed of said transferring roll;

said conveying speed of said pick-up roll being increased due to the tension of the sheet portion of the document between said transferring roll and said pick-up roll, said clutch spring being torqued in a direction opposite the direction said pick-up roll is rotating for allowing relative movement between said pick-up roll and said pick-up shaft;

said one end portion of said clutch spring allowing for delaying rotation of said pick-up roll relative to said pick-up shaft after the trailing edge of said document clears said pick-up roll, said one end portion of said clutch spring releasing from said one of said plurality of notch portions in said pick-up driving gear, when said torque in said clutch spring increases to a certain value, and catching in a next one of said plurality of notch portions, wherein said pick-up roll returns to said first conveying speed, after a certain delay, when the trailing edge of said document clears said pick-up roll.

5. The device for feeding documents as claimed in claim 4, wherein said return of said pick-up roll to said first conveying speed allows for maintaining a certain gap between said first conveyed document and a second conveyed document subsequently picked up from said document tray by said pick-up roll.

6. The device for feeding documents as claimed in claim 1, wherein:

said one end portion of said clutch spring releases from said one of said plurality of notch portions in said pick-up driving gear when torque in said clutch spring increases to a certain value and catches in a next one of said plurality of notch portions.

7. An apparatus for feeding a series of documents along a feed path from a pick-up tray into a device, comprising:

a pick-up roll for picking up and conveying a first document from said document tray into a first portion of said feed path at a first conveying speed;

a transferring roll for receiving said first document from said pick-up roll and for accelerating said first document to a second conveying speed greater than said first conveying speed and for conveying said document along a second portion of said feed path;

synchronized means for driving said pick-up roll and said transferring roll in a rotational direction at synchronizing speeds;

clutch means between said synchronized driving means and said pick-up roll for allowing rotation of said pick-up roll in said rotational direction at a rotational rate greater than said first conveying speed and for delaying rotation of said pick-up roll in said rotational direction for a certain period.

8. The apparatus for feeding documents as claimed in claim 7, wherein:

said pick-up roll is configured for picking up a second document from said document tray after said first document has been conveyed through said first portion of said feed path.

9. The apparatus for feeding documents as claimed in claim 7, wherein:

said clutch means allows for increased rotational speed of said pick-up roll while said first document is conveyed by said pick-up roll and said transfer roll and allows for delaying rotation of said pick-up roll and returning said pick-up roll to said first conveying speed after a certain period when said first document has passed from contact with said pick-up roll and is conveyed solely by said transfer roll.

* * * * *

UNITED STATES PATENT AND TRADEMARK OFFICE
CERTIFICATE OF CORRECTION

PATENT NO. : 5,141,217
DATED : August 25, 1992
INVENTOR(S) : Kyoung-Taek Lim, et al.

It is certified that error appears in the above-indentified patent and that said Letters Patent is hereby corrected as shown below:

Column 1,

Line 43    after "roll", insert —for a given—;

Signed and Sealed this

First Day of October, 1996

*Attest:*

BRUCE LEHMAN

*Attesting Officer*    *Commissioner of Patents and Trademarks*